United States Patent
McLean et al.

(10) Patent No.: US 6,259,849 B1
(45) Date of Patent: Jul. 10, 2001

(54) RAPID ASSEMBLY AND DISASSEMBLY O-RING INSTRUMENT MOUNT FOR FIBER OPTIC GYROSCOPES

(75) Inventors: Thomas McLean, Woodland Hills; Eric L. Goldner, Valencia; Michael J. Tweedy, Simi Valley, all of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/302,705

(22) Filed: Apr. 29, 1999

(51) Int. Cl.$^7$ .................................................. G02B 6/00
(52) U.S. Cl. ............................ 385/134; 385/147; 356/460
(58) Field of Search ................................. 385/12, 25, 134, 385/147; 356/3, 49, 350; 73/1.77, 503.3–504.18

(56) References Cited

U.S. PATENT DOCUMENTS

| | | | |
|---|---|---|---|
| 5,168,756 | * 12/1992 | Hulsing, II | 73/505 |
| 5,486,922 | * 1/1996 | Cordova | 356/350 |
| 5,818,590 | * 10/1998 | Patterson | 356/350 |
| 5,846,199 | * 4/1999 | Mark et al. | 356/350 |

* cited by examiner

Primary Examiner—John D. Lee
Assistant Examiner—Sarah N. Song

(74) Attorney, Agent, or Firm—Lewis B. Sternfels

(57) ABSTRACT

A temporary latchable or clasping interengageable interconnection mechanism is provided for an optical gyroscope assembly (10) to enable it to be rapidly and non-harmfully assembled and disassembled prior to a more durable interconnection, to facilitate repair and rework. The assembly includes a fiber optic spool (12), an inner shield (16) and an outer shield (18), which are formed of a stress-annealed magnetically permeable, and generally malleable material. Should the assembly be dropped, bent or dented, their magnetic shielding properties will be compromised, which is the harm to be avoided by the temporary interconnection. Accordingly, the fiber optic spool (12) and the inner shield (16) are temporarily interconnectable with the outer shield (18) and its spacer ring (38) by interengageable elements having the ability to latch or clasp the shield and the spacer ring together to prevent or, at a minimum, resist disassembly therebetween. The temporary interconnection includes grooves (44, 46) respectively in a tubular wall (36) of the spool and in a corresponding element in the spacer ring. An O-ring (48) is positioned in the grooves, and provides easy assembly and disassembly. The O-ring also serves to center the inner shield within the outer shield to establish a concentric relationship between the two, to avoid a radial metal-to-metal contact therebetween, and to mitigate against chattering which otherwise would affect the fidelity of the gyroscope output.

16 Claims, 1 Drawing Sheet

RAPID ASSEMBLY AND DISASSEMBLY O-RING INSTRUMENT MOUNT FOR FIBER OPTIC GYROSCOPES

CROSS-REFERENCE TO RELATED APPLICATION

Not Applicable

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to fiber optic gyroscopes and, more particularly, to a temporary interconnection between gyroscope components prior to effecting a more durable connection between them.

2. Description of Related Art and Other Considerations

A fiber optic gyroscope of the type encompassed by the present invention typically comprises an assembly which includes, inter alia, an optical fiber coil wound on and secured to a spool, and magnetic shielding enclosing the fibers. Such magnetic shielding may include the spool itself and a cover secured to the spool to form a magnetically protective housing enclosing the coil. An outer or external shield is placed over this protective housing, further to enhance the magnetic shielding about the optical fiber coil. It is conventional to bond the spool and the outer shield together, through the intermediary of a spacer ring, to which the spool and the shield are bonded, to secure the two together. This assembly is then bolted to a support, such as an inertial instrument block. Because the attachment of the inner and outer shields to the spacer ring is of a generally permanent nature, such as by bonding or welding, it is difficult to dismantle the assembly, such as for rework or repair. Such rework occurs during early production, when it is needed to open the assembly, which can occur multiple times to repair minor failures.

In the above-described construction, the inner and outer shields are formed of a high magnetically permeable material, which is subjected to a stress annealing process to enhance and maximize the magnetic properties. The annealing process renders the shields generally malleable and, therefore, they are vulnerable to harm. As a consequence, they are strain and impact sensitive and, should the assembly be dropped, bent, dented or even mishandled, or slightly deformed, whether innocently or carelessly caused, the magnetic shielding properties will be compromised and, thus, the magnetic properties invariably will be deleteriously affected. Such mishandling or mishap can occur during the above-mentioned dismantling and disassembly, e.g., for repair and rework, when the bond joint must be broken between the inner shield and spool assembly and the outer shield. It has been estimated that such dropping, bending, denting, or mishandling causes about 10% of all assemblies, that is, the spools and their contained fiber optics and associated parts, to be irreparably damaged and, therefore, to need replacement.

SUMMARY OF THE INVENTION

These and other problems are successfully addressed and overcome by the present invention by replacing the relatively permanent bonding between the inner shield and spool assembly and outer shield with a temporary structural interconnection. After all rework and repair is completed, the assembly is bolted or otherwise secured to a support for long term attachment.

Specifically, the temporary interconnection is formed by a resilient latchable or clasping interengageable coupling between the intermediary spacer ring and, preferably, the spool. This latchable or clasping interengageable coupling prevents, or at a minimum resists, inadvertent disassembly effected by the temporary interconnection. The preferred coupling comprises an O-ring residing within and between annularly configured grooves in the respective spacer ring and spool. When the assembly is bolted or otherwise secured to a support, this more durable interconnection supersedes the temporary interconnection. In addition, the temporary interconnection effected by the O-ring performs several desirable functions. It centers the inner shield within the outer shield to establish a concentric relationship between the two, avoids a radial metal-to-metal contact therebetween, reduces vibratory inputs, and mitigates against chattering which otherwise would affect the transmission in the optical fibers.

Several advantages are provided thereby. Primarily, harm to the magnetic properties of the material of the shields is reduced to a minimum. Repair and rework is facilitated without damage to the parts. Labor costs for repair and rework are reduced. Manufacturing scrap is decreased, with corresponding savings in parts and materials. Performance is enhanced through maintaining concentricity between the spool and coil with respect to the outer shield.

Other aims and advantages, as well as a more complete understanding of the present invention, will appear from the following explanation of exemplary embodiments and the accompanying drawings thereof.

DETAILED DESCRIPTION OF THE PREFERRED EMBODIMENTS

Figure 1:
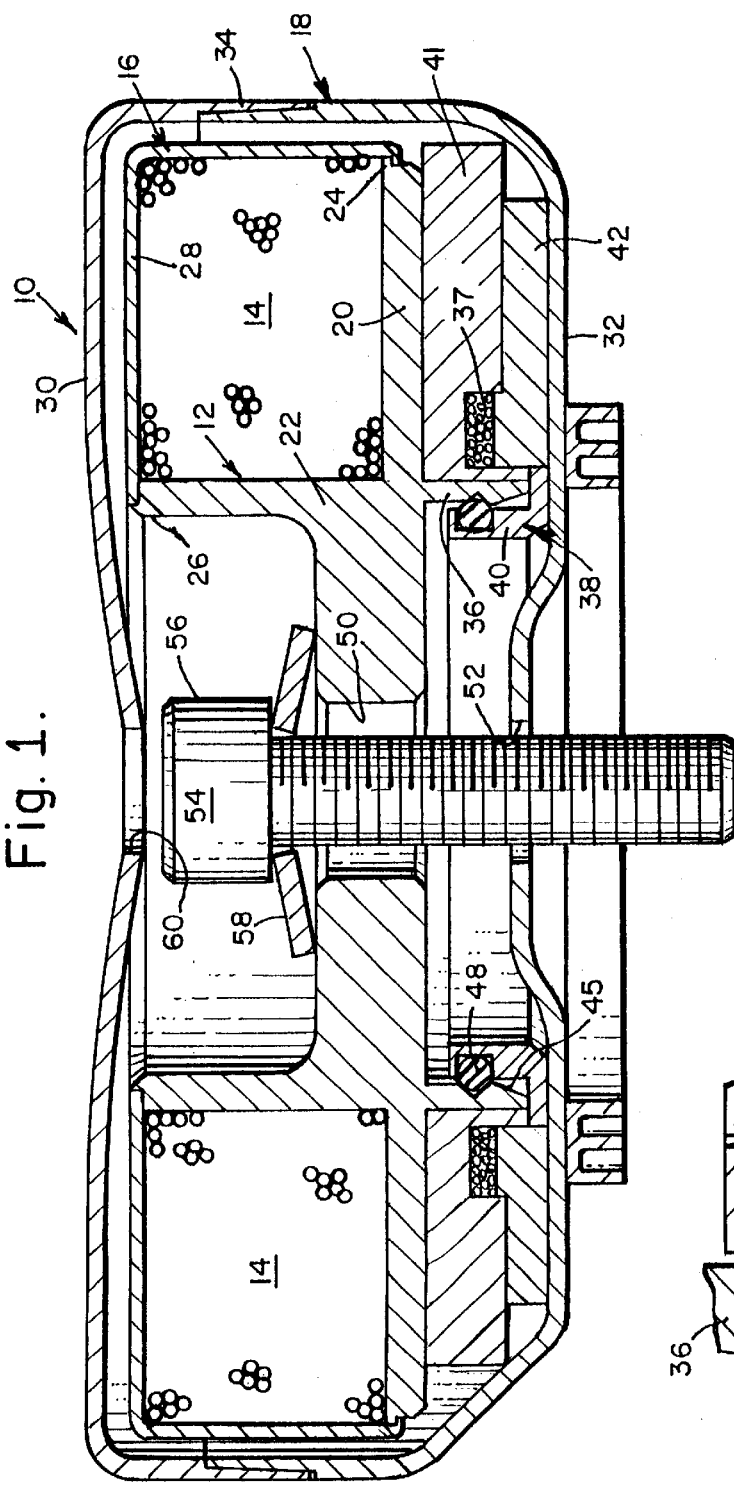
FIG. 1 is cross-sectional view of the present invention.
Figure 2:
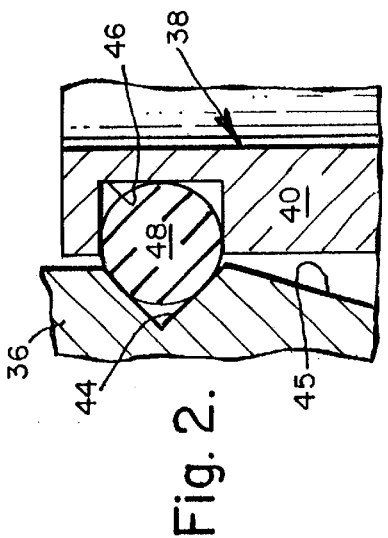
FIG. 2 is an enlarged view of the O-ring interconnection between mating parts enabling rapid assembly and disassembly of the instrument in which it is installed.

As depicted in FIGS. 1 and 2, a gyroscopic assembly 10 comprises a spool 12, an optical fiber coil 14 secured to and supported by the spool, an inner shield 16, and an outer or external shield 18. The spool includes a base 20 and a tubular wall 22 extending perpendicularly from the base to form an annularly shaped seat for supporting coil 14. Base 20 and wall 22 terminate in respective ends 24 and 26 to which a cover 28 is secured. Inner shield 16 is therefore defined by base 20, tubular wall 22 and cover 28. Outer shield 18 is formed from upper and lower shield portions 30 and 32, which are secured together at a joint 34.

Spool 12 further includes a downwardly extending tubular wall 36 which forms, with base 20, an annularly shaped seat for supporting additional optical fibers and opto-electronic devices 37 therefor on or within an optics carrier 41, which latter elements are not germane to the present invention. Therefore, they will not be further discussed herein.

A spacer ring 38 is secured to lower portion 32 of the outer shield, and includes an upwardly extending annular wall 40 which extends within downwardly extending annular wall 36 of the spool in a non-contacting, concentric manner. An optics carrier lid 42 is positioned to close off the annularly shaped seat defined by downwardly extending tubular wall 36 and base 20.

Downwardly extending tubular wall 36 and upwardly extending annular wall 40 are provided with respective annularly configured grooves 44 and 46 into which an O-ring 48 resides to secure spool 12 and lower portion 32 together in a latching or clasping interengageable engagement. This latching engagement prevents or, at a minimum, resists inadvertent disassembly effected by the temporary interconnection. Tubular wall 36 incorporates a tapered portion 45 that produces a centering function and facilitates the O-ring engagement into groove 44 while preventing any damage to the O-ring. O-ring 48 also serves to center the spool within outer shield 18, and avoids metal-to-metal contact therebetween. Groove 44 has a V-shaped configuration into which the O-ring can fit, while groove 46 has a U-shaped configuration to act as a retainer for the O-ring before and after assembly of the spool and outer shield. The grooves may be configured to have rounded edges to protect the O-ring from damage.

Spool 12 and lower portion 32 of outer shield 18 are provided respectively with aligned central openings 50 and 52, through which a cap screw 54 extends. A head 56 on the cap screw sandwiches a Belleville washer 58, or lock washer, between it and spool 12. An opening 60 in upper portion 30 provides access to allow torquing of screw 54. The cap screw enables assembly 10 to be firmly secured to a support. After assembly 10 is firmly attached to the support by screw 54, the temporary interconnection between spool 12 and outer shield 18 is superseded thereby. Once the screw is tightened, a rigid attachment is achieved.

Inner and outer shields 16 and 18 are formed of a highly permeable magnetic material, which is stress annealed to enhance and maximize the magnetic properties of assembly 10. The enhanced properties protect fiber optic coil 14 and its associated opto-electronic equipment from the effects of magnetic field interaction effects, such as Faraday rotation. Specifically, the inner and outer shields act as paths to redirect possibly deleterious magnetic fields around the parts housed with the shields.

The annealing process, however, renders the shields generally malleable and, therefore, they are easily subject to harm. They are thus strain and impact sensitive and, should the assembly be harmed, such as by being dropped, bent, dented or even mishandled or slightly deformed, whether of an innocent or careless nature, the magnetic shielding properties will be compromised and, therefore, the magnetic properties invariably will be deleteriously affected. Such mishandling or mishap often occurs during the above-mentioned dismantling and disassembly, e.g., for repair and rework, when the inner shield and spool assembly must be separated from the outer shield. Therefore, it is important that, when rework and repair is required, which is often during the manufacture of assembly 10, it is critical to protect the assembly from such harm. The use of O-ring 46 in grooves 44 and 46 enables the assembly to be easily disassembled and re-assembled with little potential of harm.

While the present invention has been described as useful with fiber optic gyroscopes, it is equally adaptable to ring laser gyroscopes.

Although the invention has been described with respect to particular embodiments thereof, it should be realized that various changes and modifications may be made therein without departing from the spirit and scope of the invention.

What is claimed is:

1. An optical gyro assembly including a fiber optic coil, a spool supporting the coil, a cover having a connection with the spool for enclosing the coil, and an external shield enclosing the spool and the cover, in which the spool, the cover and the external shield are formed from a relatively deformable, stress-annealed material having improved magnetic flow-path properties for protecting the coil from externally degrading magnetic influences, the improvement in securing the spool to the external shield without compromising the magnetic flow-path properties of the deformable material, comprising a temporary latching interengageable interconnection between the spool and the external shield arranged to protect the spool, the cover and the external shield from material deforming harm.

2. The improvement according to claim 1 in which said temporary interconnection comprises walls extending from said spool and said external shield an a side-by-side manner, alignable grooves respectively in said walls, and an O-ring positioned in said alignable grooves.

3. The improvement according to claim 2 in which said walls comprise inner and outer concentrically positioned tubular walls.

4. The improvement according to claim 3 in which said grooves are respectively configured with a U-shape and a V-shape.

5. The improvement according to claim 4 in which said U-shaped groove is positioned in said inner wall and said V-shaped groove is positioned in said outer wall.

6. The improvement according to claim 1 wherein said optical gyro comprises a ring laser gyro.

7. In an optical gyro assembly, a mechanism for interconnecting parts of treated material having magnetic flow-path properties and including a spool supporting a fiber optic coil, and an external shield enclosing the spool, comprising:
   a temporary latching interengageable interconnection between said parts for enabling assembly and disassembly therebetween without deleteriously affecting the magnetic flow-path properties thereof and optical characteristics relating to the gyro assembly; and
   a durable interconnection for enabling an interconnection between said parts, which durable interconnection is more durable than the temporary interconnection.

8. A mechanism for interconnecting parts in an optical gyro assembly in which said parts include a fiber optic coil spool, and an external shield enclosing the spool, comprising:
   a temporary latchable interengageable interconnection between said parts for enabling assembly and disassembly therebetween without potentially harming any components in the optical gyro assembly; and
   a durable interconnection for enabling an interconnection between said parts, which durable interconnection is more durable than the temporary interconnection.

9. An interconnection mechanism according to claim 8 wherein said durable interconnection mechanism includes a bolt which extends through said parts and is adapted to be engaged to a support for securing the optical gyro assembly thereto.

10. A method for interconnecting parts in an optical gyro assembly, in which the parts include a fiber optic coil spool, and an external shield enclosing the spool, to enable a rapid and non-harmful assembly and disassembly of the parts prior to a more durable interconnection therebetween, comprising the steps of:
   establishing a temporary latching interengageable interconnection between the parts for enabling assembly and disassembly therebetween without potentially harming any components in the optical gyro assembly; and thereafter establishing a durable engagement for enabling an interconnection between the first and second parts which is more durable than the temporary interconnection.

11. In an optical gyro assembly, a mechanism for interconnecting parts of treated material having magnetic flow-path properties, comprising:

a temporary interconnection between said parts for enabling assembly and disassembly therebetween without deleteriously affecting the magnetic flow-path properties thereof and optical characteristics relating to the gyro assembly, said temporary interconnection including first and second parts in the optical gyro assembly, said parts having respective mutually alignable openings; and a resilient connector disposed in said openings and between said first and second parts for enabling a resilient but firm engagement between said parts; and a durable interconnection for enabling an interconnection between said parts, which durable interconnection is more durable than the temporary interconnection.

12. A mechanism according to claim 11 in which said respective mutually alignable openings comprise an annular opening and said resilient connector comprises an O-ring.

13. An interconnection mechanism in an optical gyro assembly for enabling a rapid and non-harmful assembly and disassembly thereof prior to a more durable interconnection therein, comprising:

first and second parts in the optical gyro assembly, said parts having respective mutually alignable openings;

a durable interconnection mechanism for establishing an interconnection between said first and second parts; and a resilient connector disposed in said respective mutually alignable openings and between said first and second parts for enabling a temporary interconnection therebetween which is less durable than said durable interconnection.

14. An interconnection mechanism according to claim 13 in which said respective mutually alignable openings comprise annularly configured grooves facing one another, and said resilient connector comprises an O-ring, said O-ring and said grooves cooperating further to enable centering of said parts with respect to one another.

15. An optical gyro assembly including a fiber optic coil, a spool supporting the coil, a cover having a connection with the spool for enclosing the coil, and an external shield enclosing the spool and the cover, in which the spool, the cover and the external shield are formed from a relatively deformable, stress-annealed material having improved magnetic flow-path properties for protecting the coil from externally degrading magnetic influences, the improvement in securing the spool to the external shield without compromising the magnetic flow-path properties of the deformable material, comprising a temporary interconnection between the spool and the external shield arranged to protect the spool, the cover and the external shield from material deforming harm, said temporary interconnection including alignable grooves respectively in said spool and said external shield and an O-ring positioned in said alignable grooves.

16. The improvement according to claim 15 further including a tapered entry positioned adjacent to one of said grooves to facilitate engagement of said O-ring in said grooves and to center said spool with respect to said external shield.

* * * * *